(12) United States Patent
Hull et al.

(10) Patent No.: US 7,689,471 B2
(45) Date of Patent: Mar. 30, 2010

(54) MEDIUM AND METHOD PROVIDING THE ABILITY TO DISPLAY OR HIDE A WOOD LOAD FROM BUYER VIEW

(75) Inventors: Steve Allen Hull, Snoqualmie, WA (US); Robert Scoverski, Seattle, WA (US); Steven John Malloy, Redmond, WA (US); Scott Joseph Bean, Seattle, WA (US); Cameron Daniel Knudson, Seattle, WA (US); Michael David Hartway, Sammamish, WA (US)

(73) Assignee: Silvaris Corporation, Bellevue, WA (US)

( * ) Notice: Subject to any disclaimer, the term of this patent is extended or adjusted under 35 U.S.C. 154(b) by 0 days.

(21) Appl. No.: 11/755,474

(22) Filed: May 30, 2007

(65) Prior Publication Data

US 2007/0282702 A1     Dec. 6, 2007

Related U.S. Application Data

(60) Provisional application No. 60/803,601, filed on May 31, 2006.

(51) Int. Cl.
 *G06Q 30/00* (2006.01)
 *G06F 17/30* (2006.01)
(52) U.S. Cl. ............... 705/26; 705/27; 705/80
(58) Field of Classification Search ............ 705/1, 705/26–27, 80
See application file for complete search history.

(56) References Cited

U.S. PATENT DOCUMENTS

| | | | |
|---|---|---|---|
| 7,107,226 B1* | 9/2006 | Cassidy et al. | 705/26 |
| 2002/0052802 A1 | 5/2002 | Westbrook et al. | |
| 2002/0065763 A1* | 5/2002 | Taylor et al. | 705/37 |
| 2002/0072975 A1* | 6/2002 | Steele et al. | 705/14 |
| 2003/0055743 A1 | 3/2003 | Murcko | |
| 2003/0236707 A1 | 12/2003 | Cheney | |
| 2004/0215527 A1* | 10/2004 | Grove et al. | 705/26 |
| 2005/0090235 A1* | 4/2005 | Vermola et al. | 455/414.3 |
| 2006/0173767 A1* | 8/2006 | Hansen | 705/35 |

OTHER PUBLICATIONS

Cashing In: When it finally comes time to sell your firm, don't make these mistakes. Financial Planning , p. ITEM05244007 , Sep. 1, 2005. Recovered from Dialog Database on Oct. 29, 2009.*

* cited by examiner

*Primary Examiner*—Jeffrey A. Smith
*Assistant Examiner*—William J. Allen
(74) *Attorney, Agent, or Firm*—Black Lowe & Graham PLLC; P. G. Scott Born

(57) ABSTRACT

A method implementable in an electronic system coupled to an electronic device, the electronic device being coupled to a display device. A description of a load to display is received from the seller. At least one term governing the sale of the load is received from the seller. A definition of product items that will appear on the load is received from the seller. A web page displayable on the display device is served to the electronic device. The displayed web page includes a description of the load. A purchase order for the load is received from the electronic device.

2 Claims, 11 Drawing Sheets

101

210

230

240

Silvaris CORPORATION

CustomerConnect™
Welcome Joe Customer of Sample Company Name

Joe Trader
888-856-6677
joetrader@silvaris.com
My Account

Available Loads

| Panel closeouts – Regular Flatbed – Delivered – On Accumulation | Qty | Price | Ext Price |
|---|---|---|---|
| MDF 4' X 4' brand 1 1/4 inch Square | 1,000 pieces | $10.00 / MSFT | $160.00 |
| Subtotal: | 1,000 pieces | | $160.00 |
| OSB 4' X 8' Econ 1 inch Square | 10 units, 50 pieces/unit | $20.00 / MSFT | $320.00 |
| brand 4' X 8' Econ 1/2 inch Square | 3 units, 25 pieces/unit | $18.00 / MSFT | $43.20 |
| Subtotal: | 13 units | | $363.20 |
| | | Total: | $523.20 Buy |

Ed, check out this great deal on panels

Messages Click here to Send a New Message

5/26/2006
[1:55 PM - Ed] Mike, I realy like the OSB but could you change it to 3/4" instead?

Copyright 2000-2006. Silvaris Corporation. All Rights Reserved.

Fig. 7

MEDIUM AND METHOD PROVIDING THE ABILITY TO DISPLAY OR HIDE A WOOD LOAD FROM BUYER VIEW

PRIORITY CLAIM

This application claims priority to U.S. provisional patent application Ser. No. 60/803,601 filed May 31, 2006 and to U.S. patent application Ser. No. 11/624,145 filed Jan. 17, 2007 and to U.S. provisional patent application Ser. No. 60/870,597 filed Dec. 18, 2006 and to U.S. patent application Ser. No. 11/423,938 filed Jun. 13, 2006 and to U.S. provisional patent application 60/760,005 filed Jan. 17, 2006 and to U.S. patent application Ser. No. 11/329,414 filed Jan. 9, 2006 that in turn, claims priority to U.S. provisional patent application Ser. No. 60/690,407 filed Jun. 13, 2005 and to U.S. provisional patent application Ser. No. 60/644,327 filed Jan. 13, 2005 and to U.S. provisional patent application Ser. No. 60/642,127 filed Jan. 7, 2005. All of the above applications are hereby incorporated by reference in their entirety as if fully set forth herein.

COPYRIGHT NOTICE

This disclosure is protected under United States and International Copyright Laws. © 2005-2007 Silvaris Corporation. All Rights Reserved. A portion of the disclosure of this patent document contains material which is subject to copyright protection. The copyright owner reserves all copyright rights whatsoever.

FIELD OF THE INVENTION

An embodiment of the invention relates generally to network and Internet based computer software and systems to facilitate more efficient and convenient purchase and sale of items of inventory.

BACKGROUND OF THE INVENTION

With the advent of the Internet age, many industries have adopted online sales as one of their platforms for advertising wares and enabling purchases by customers. The Internet is an efficient platform by which to communicate product availability to a large customer base. Additionally, the ability to allow a buyer to purchase products via the Internet is a time-saving and cost-saving benefit to sellers and buyers alike.

The wood products industry has a need for technology that allows suppliers to easily display their offerings and buyers to easily select and purchase them online. Challenges to representing wood products online include:

Wood market conditions often change rapidly, and sellers must adjust quickly by presenting different customers with different price and availability information;

Sellers may present a wide variety of options to customers for filling their product needs, and sellers may want to choose a specific product;

Each product's technical specifications (for example species, grade, dimension, surfacing, moisture content) are often very important to buyers in manufacturing, construction, and other applications, yet specs may vary across manufacturer;

Seller's offers may not match a buyer's preferred representation of product quantity, and vice versa, so various conversions are often required. For example, while a wood buyer may plan purchases based on a price per railcar, per truckload, per bundled unit, or per piece, the seller may be offering product priced per board-foot, square foot, or cubic meters.

BRIEF DESCRIPTION OF THE DRAWINGS

Embodiments of the present invention are described in detail below with reference to the following drawings:

FIG. 7 depicts a screen shot of one embodiment of the invention showing an available loads page that a customer might see when logged into the system.

DETAILED DESCRIPTION OF THE PREFERRED EMBODIMENTS

Embodiments of the current invention described herein provide methods for sellers and buyers to address challenges to selling online. Sellers may define "loads" for one or more customers with specific product, price, availability, shipping, and other information. Buyers see this information on the Internet and may choose to purchase the product, if they meet the seller's criteria. In an alternative embodiment, buyers may also build their own loads based on items sellers provide.

In this description and accompanying figures, "sellers" may include manufacturers, distributors, wholesalers, and/or resellers. Sellers may be participants in negotiation processes with buyers that may include but are not limited to determining the nature of the products that will be sold, the pricing rules and amounts for the products, and/or the timing and details of shipment of the products. Sellers may provide data related to the nature and descriptions of the products and the available current and future quantities of the products. "Buyers" may be purchasers and/or consumers of products. Buyers may be participants in negotiation processes with sellers that may include but are not limited to determining the nature of the products that will be sold, the pricing rules and amounts for the products, and/or the timing and details of shipment of the products. Buyers may provide data related to the specific types of products they wish to purchase, and the quantities of products as well as desired time and location to receive products. A "load" may be a shipment of wood products, a group of items that generally originate in a single location and may be delivered by one or more ocean vessels, railcars, trucks, or other freight transport method to a destination.

An embodiment of the invention may be used by Silvaris Corporation to sell product to customers, or used by other sellers, such as lumber and panel mills to sell products to their own customers.

An embodiment of the invention includes network-based software interfaces, business rules, data structures, data, and interactions between these interfaces, rules, structures, and data.

The system provides a means for sellers to present potential buyers with price and availability information about wood products with advanced control over which products each customer (or group of customers) sees, how he sees them displayed, the prices he is offered, when the offer is available or can be delivered, and other details. The system provides online convenience to buyers of wood products, and also benefits sellers by allowing them to, for example, make special offers to only certain customers, restrict certain product information from customers, or set minimum purchase quantities.

Figure 10:
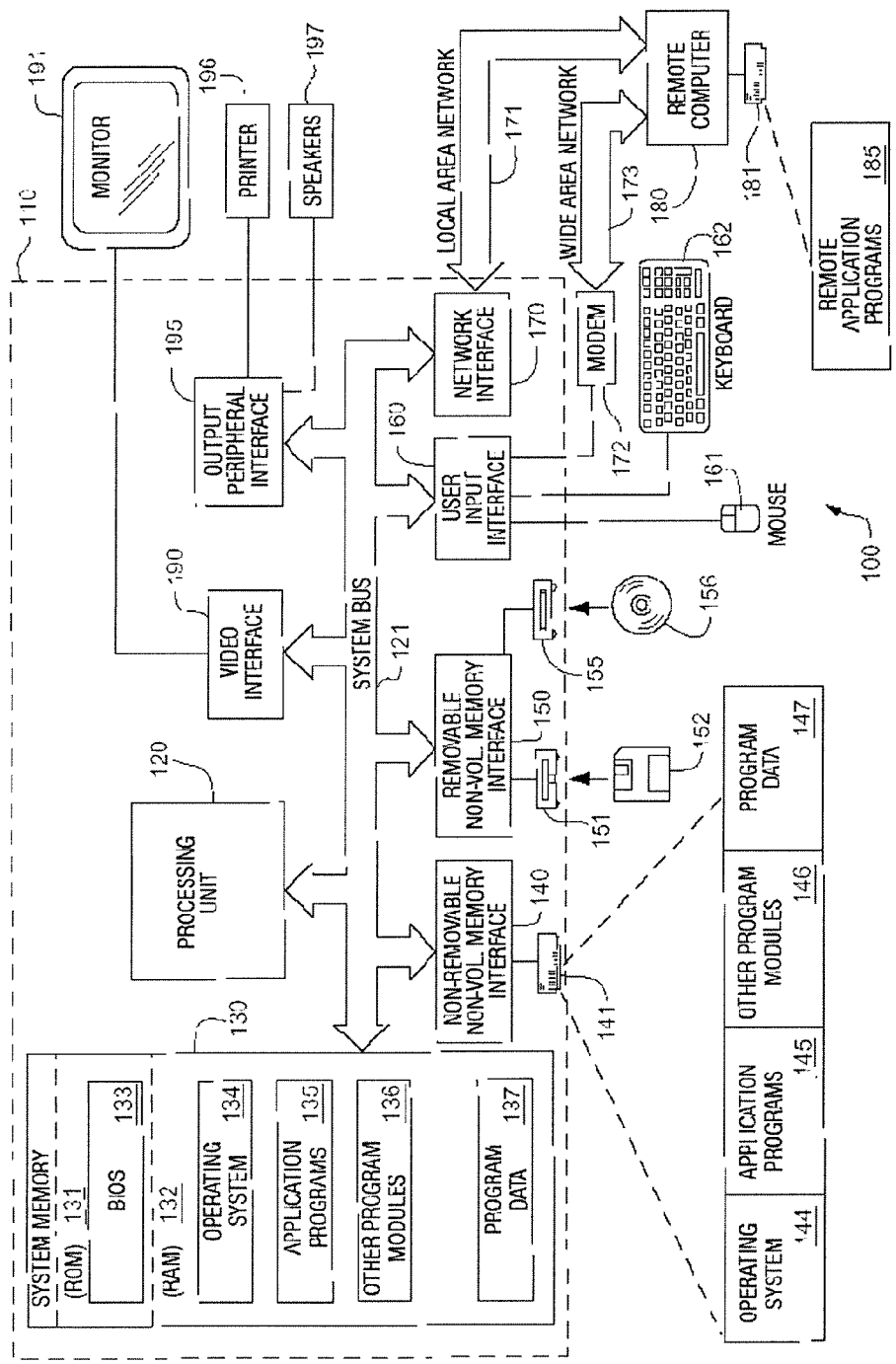
FIG. 10 is a schematic view of an exemplary operating environment in which an embodiment of the invention can be implemented.

FIG. 10 illustrates an example of a suitable computing system environment 100 on which embodiments of the invention may be implemented. The computing system environment 100 is only one example of a suitable computing environment and is not intended to suggest any limitation as to the scope of use or functionality of embodiments of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing embodiments of the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 10 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10, provide storage of computer readable instructions, data structures, program modules and other data for the computer 110. In FIG. 10, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

Figure 11:
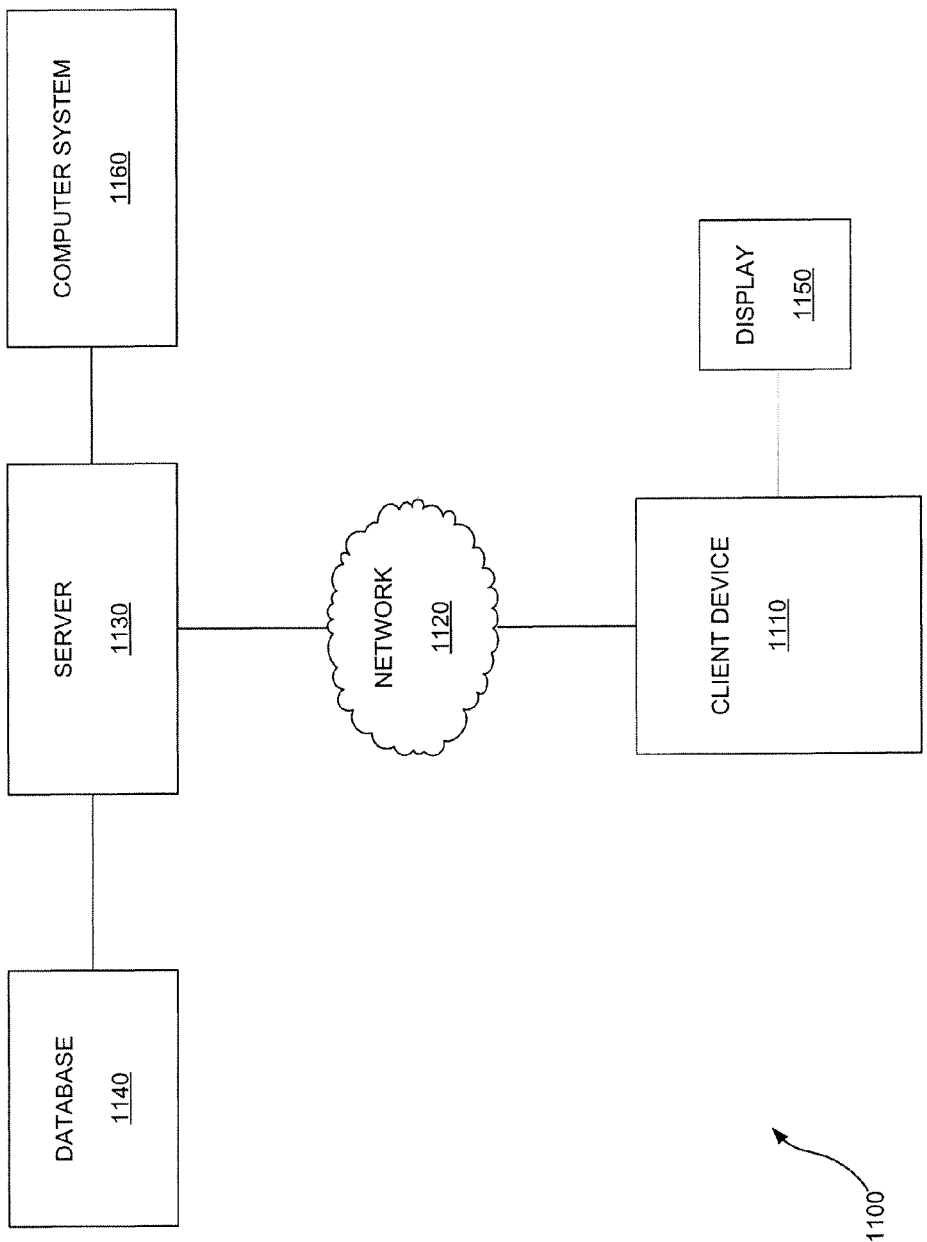
FIG. 11 is a functional block diagram of an exemplary operating environment in which an embodiment of the invention can be implemented.

Referring now to FIG. 11, an embodiment of the present invention can be described in the context of an exemplary computer network system 1100 as illustrated. System 1100 includes an electronic client device 1110, such as a personal computer or workstation, that is linked via a communication medium, such as a network 1120 (e.g., the Internet), to an electronic device or system, such as a server 1130. The server 1130 may further be coupled, or otherwise have access, to a database 1140 and a computer system 1160. Although the embodiment illustrated in FIG. 11 includes one server 1130 coupled to one client device 1110 via the network 1120, it should be recognized that embodiments of the invention may be implemented using one or more such client devices coupled to one or more such servers over one or more such networks.

In an embodiment, each of the client device 1110 and server 1130 may include all or fewer than all of the features associated with the computer 110 illustrated in and discussed with reference to FIG. 10. Client device 1110 includes or is otherwise coupled to a computer screen or display 1150. Client device 1110 can be used for various purposes including both network- and local-computing processes.

The client device 1110 is linked via the network 1120 to server 1130 so that computer programs, such as, for example, a browser, running on the client device 1110 can cooperate in two-way communication with server 1130. Server 1130 may be coupled to database 1140 to retrieve information therefrom and to store information thereto. Database 1140 may include a plurality of different tables (not shown) that can be used by server 1130 to enable performance of various aspects of embodiments of the invention. Additionally, the server 1130 may be coupled to the computer system 1160 in a manner allowing the server to delegate certain processing functions to the computer system.

Figure 1:
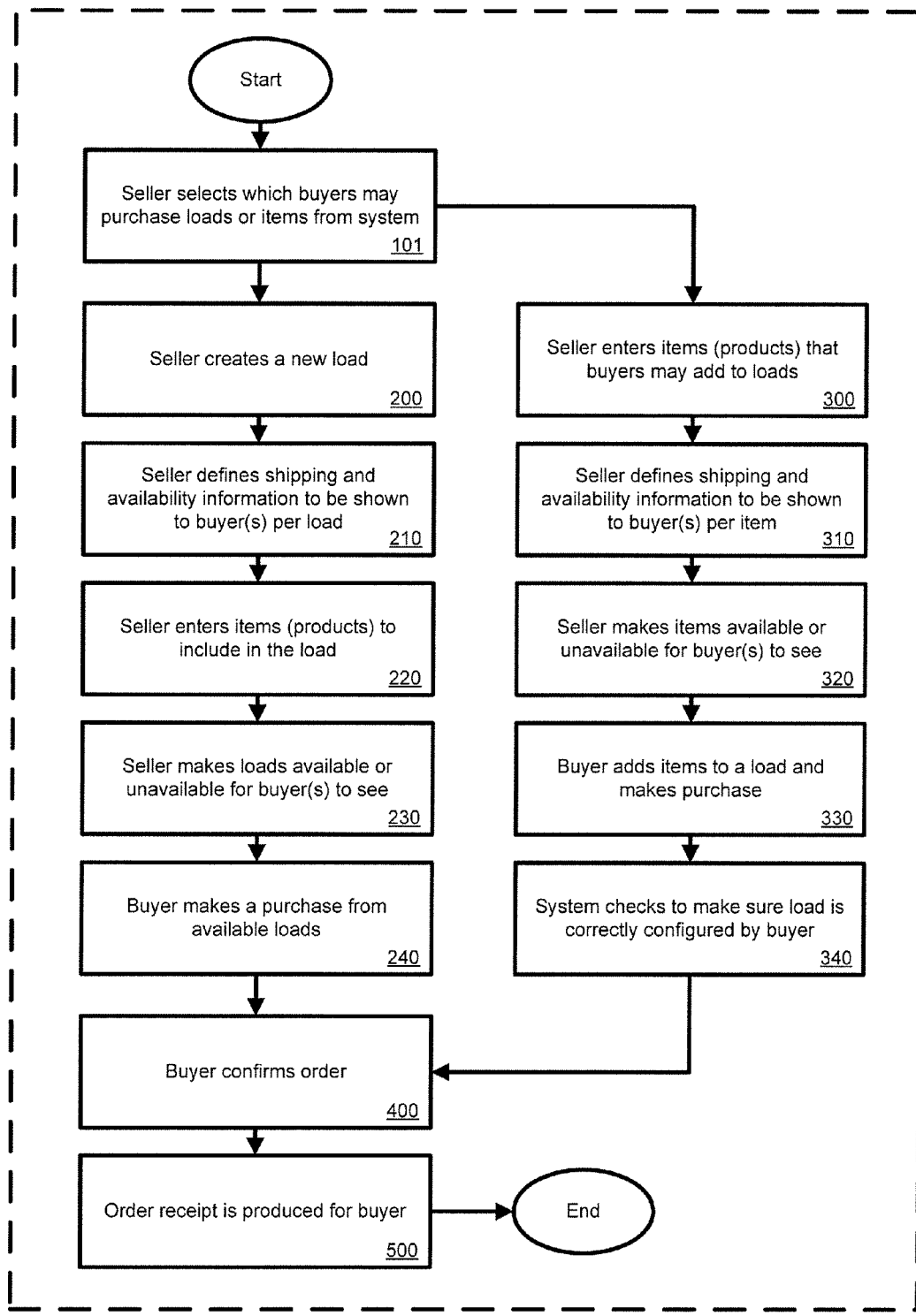
FIG. 1 illustrates an overview of a process to facilitate the display of various wood products for purchase according to an embodiment.

FIG. 1 illustrates a process, according to an embodiment of the invention, that facilitates the display (e.g., on the display 1150) of various wood products for purchase. The process is illustrated as a set of operations shown as discrete blocks. The process may be completely or partially implemented in any suitable hardware, software, firmware, combination thereof, computer-readable media, and/or the system 1100 illustrated in FIG. 11.

The number and order in which the operations are described is not to be necessarily construed as a limitation. For example, sellers may select buyers prior to creating loads for the buyers (as shown in block 101), or sellers may elect to show anyone loads, then approve or reject a buyer or his purchases after registration, login, order confirmation (block 400) or producing a receipt (block 500). Buyers with no available credit from the seller, for example, may be allowed to browse the seller's loads or items for sale, but not complete purchases.

At block 101, sellers select which buyers may purchase loads or items online (e.g., by employing the system 1100 illustrated in FIG. 11). Buyers may be selected or restricted based on available credit, delivery considerations, payment histories, and other factors.

At block 200, sellers create a load to display (e.g., on the display 1150) to a buyer, or to a group of buyers.

At block 210, sellers define how the product is sold, including but not limited to a headline title for the offer, the length of the offer, the amount of product available, the estimated ship date for the product, how the product will ship, and other notes.

At block 220, the seller adds and edits product items that will appear on the load.

At block 230, the seller chooses to display the load to buyers, or hide them from buyer view.

At block 240, the buyer browses and purchases loads made available by the seller.

At block 400, the system presents a confirmed order to the buyer, and requests a purchase order number to complete the transaction. Terms and conditions of sale may be presented on this page.

At block 500, the order is complete, a receipt may be produced for the buyer, and the order resides in the system for fulfillment by the seller.

Figure 4:
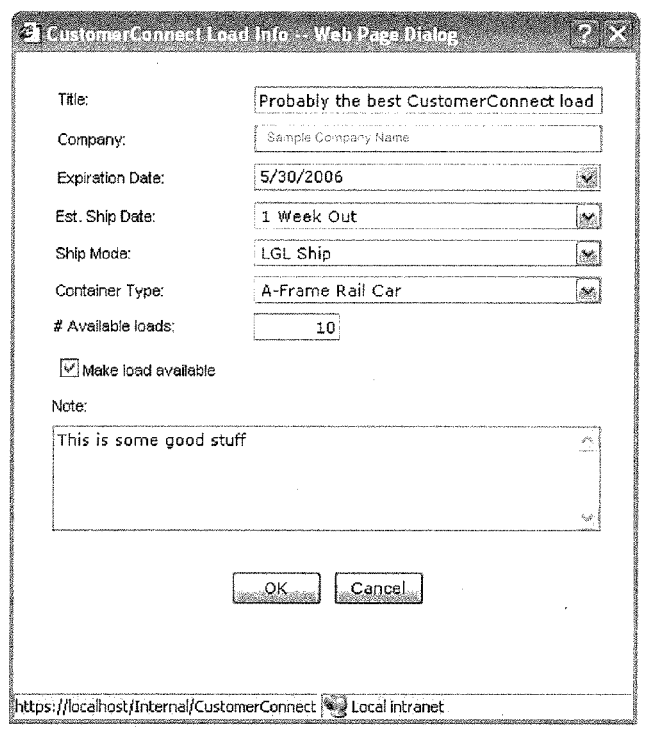
FIG. 4 depicts a screen shot of one embodiment of the invention showing how a load is made available to certain companies with shipping and product availability information.

In an alternate embodiment of the invention shown in FIG. 1, buyers may build their own loads based on the items sellers have provided them for sale. In this method, the seller sets up certain items to be available to certain buyers or groups of buyers (block 300), sets shipping and availability information per item (block 310), and makes the items available for buyers to see (block 320). Shipping and availability information may include similar controls such as offer expiration and ship date as shown in FIG. 4, and may also include restrictions on quantities (for example, minimum order quantities), delivery restrictions (for example, shipment available only to specific regions, or railcar delivery only), or other information. Buyers would then add these items to a load and make a purchase (block 330), and the system would validate that the load (block 340) has been correctly configured (for example, all product on load is from the same origin) and confirm the order (block 400).

Figure 2:
FIG. 2 depicts a screen shot of one embodiment of the invention showing how a seller selects a buyer to be allowed to purchase online.

FIG. 2 is a screen shot according to an embodiment that allows sellers to enable a specific buyer to purchase online, as described in FIG. 1, block 101. In an embodiment, to enable the customer/buyer to have access to online purchases (here in a buyer-facing view called "CustomerConnect"), the trader/seller clicks the CustomerConnect buyer checkbox and the Save Contact button to save the change. Other embodiments may allow for the selection and enablement (or exclusion) of multiple buyers by company name, company business type, delivery location, sales history, credit criteria, or other customer profile factors.

Figure 3:
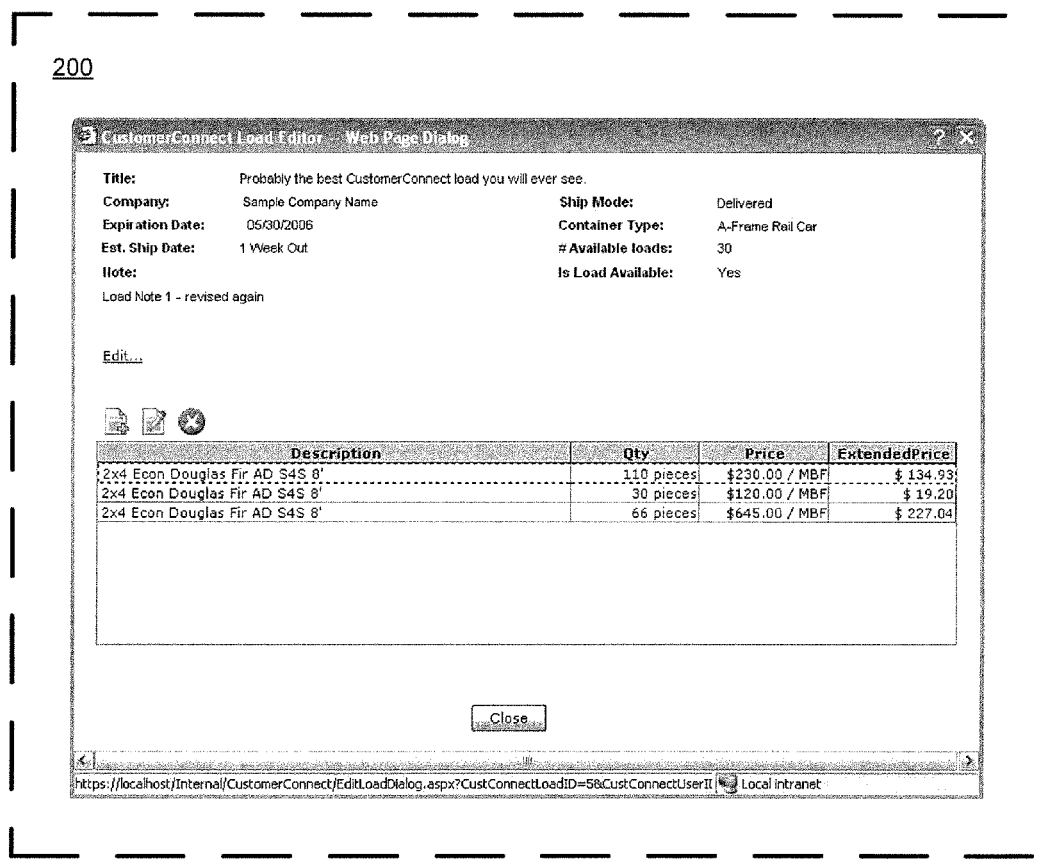
FIG. 3 depicts a screen shot of one embodiment of the invention showing an example load as defined by a seller.

FIG. 3 is a screen shot of the CustomerConnect Load Editor, one embodiment of the invention that shows a load as described in FIG. 1, block 200. In this embodiment, key load information may be summarized: the load title, the company (or companies) being shown the load, shipping information, load availability, load expiration, notes, and product details including a description, quantity, price and extended price. A seller can click "Edit . . . " to define shipping and availability information as shown in FIG. 4, or click one of three icons to add, edit, or delete product items from the load. Adding or editing an item can display a dialog box as shown in FIG. 5.

FIG. 4 is a screen shot of the CustomerConnect Load Info dialog box in one embodiment of the invention as described in FIG. 1, block 210. This dialog box controls the load title, load expiration date, load availability period, shipping mode (for example mill will ship, third party will ship, or customer will pick up), container type, number of loads available, notes, and load availability.

Figure 5:
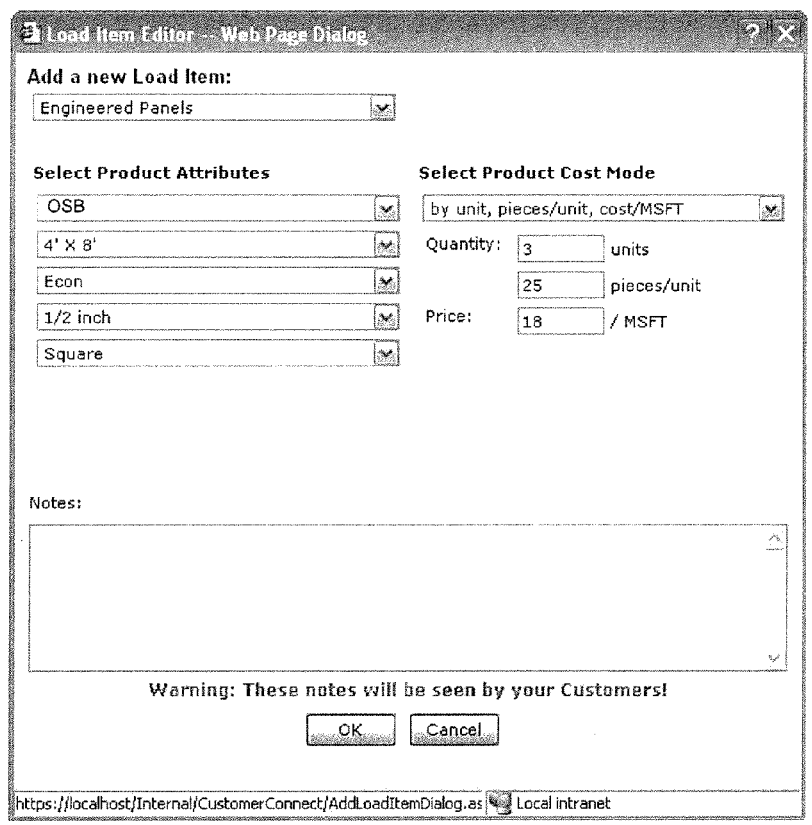
FIG. 5 depicts a screen shot of one embodiment of the invention showing how items (products) are added to a load.

FIG. 5 is a screen shot of one embodiment of the invention, the CustomerConnect Load Item Editor dialog box as described in FIG. 1, block 220. For wood products, this information may include but is not limited to the product type (for example, softwood lumber, hardwood lumber, or plywood), dimensions, grade, species, finishing, moisture, and other physical attributes useful to accurately describe and distinguish the product. The information may also include notes for the customer, and current selling price for the product based on the type of cost mode (for example, price per piece, price per square foot, price per truckload, price per cubic meter). Each cost mode may have specific inputs to calculate the total price—in the example shown the quantity, pieces per unit, and price per MSFT (thousand square feet).

Figure 6:
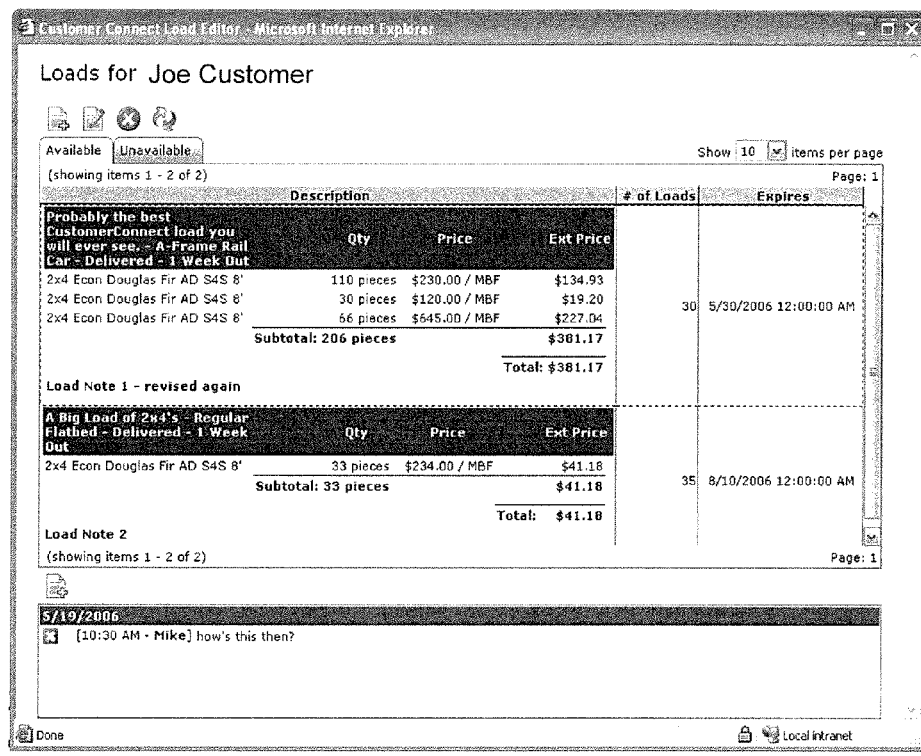
FIG. 6 depicts a screen shot of one embodiment of the invention showing a dialog box with two loads made available for a customer, and controls for editing those loads.

FIG. 6 is a screen shot of the CustomerConnect Load Editor summary view dialog box in one embodiment of the invention as described in FIG. 1, block 230. This dialog box allows sellers to turn display of loads on or off for certain customers, or to add, edit, or delete loads. Selecting the Edit Load icon displays a dialog box as shown in FIG. 3. Selecting the Add Load icon displays load definition dialog boxes as shown in FIG. 4 and FIG. 5. This dialog box also has an area for notes for communicating with buyers.

FIG. 7 is a screen shot of one embodiment of the invention, the CustomerConnect view a buyer may see, as described in FIG. 1, block 240. This view summarizes key buying information on all available loads for that customer on a personalized screen. A message area for communicating with the seller is also shown. When the buyer clicks the Buy button, the interface illustrated in FIG. 8 may be displayed.

Figure 8:
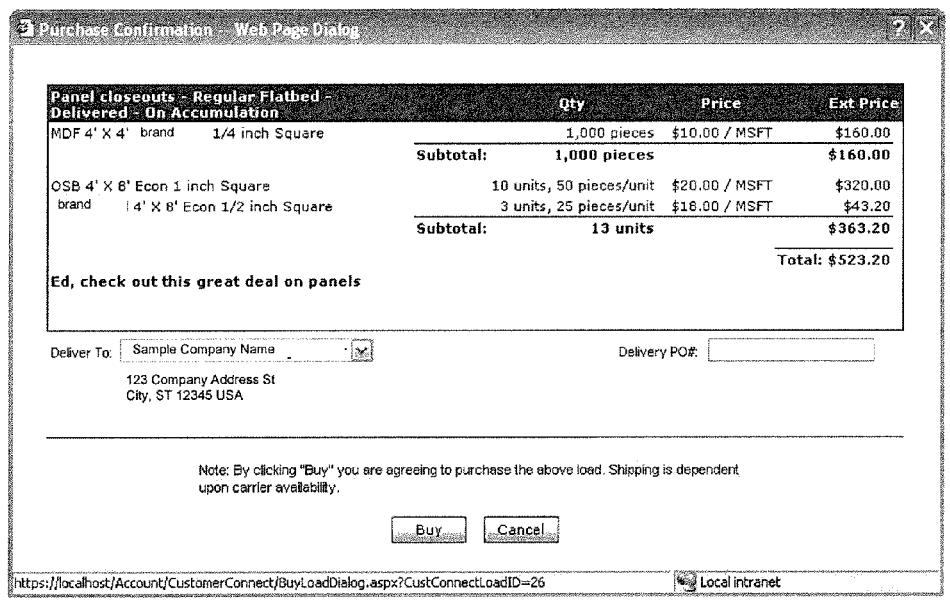
FIG. 8 depicts a screen shot of one embodiment of the invention showing a customer a purchase confirmation page.

FIG. 8 is a screen shot of one embodiment of the invention, a buyer's purchase confirmation screen from CustomerConnect, as described in FIG. 1, block 400. This screen summarizes the order for a buyer, including all product information on the load, terms of sale, and other information. The buyer selects a delivery destination from one or more locations, and enters a purchase order before clicking the Buy button, which may cause the screen in FIG. 9 to appear.

Figure 9:
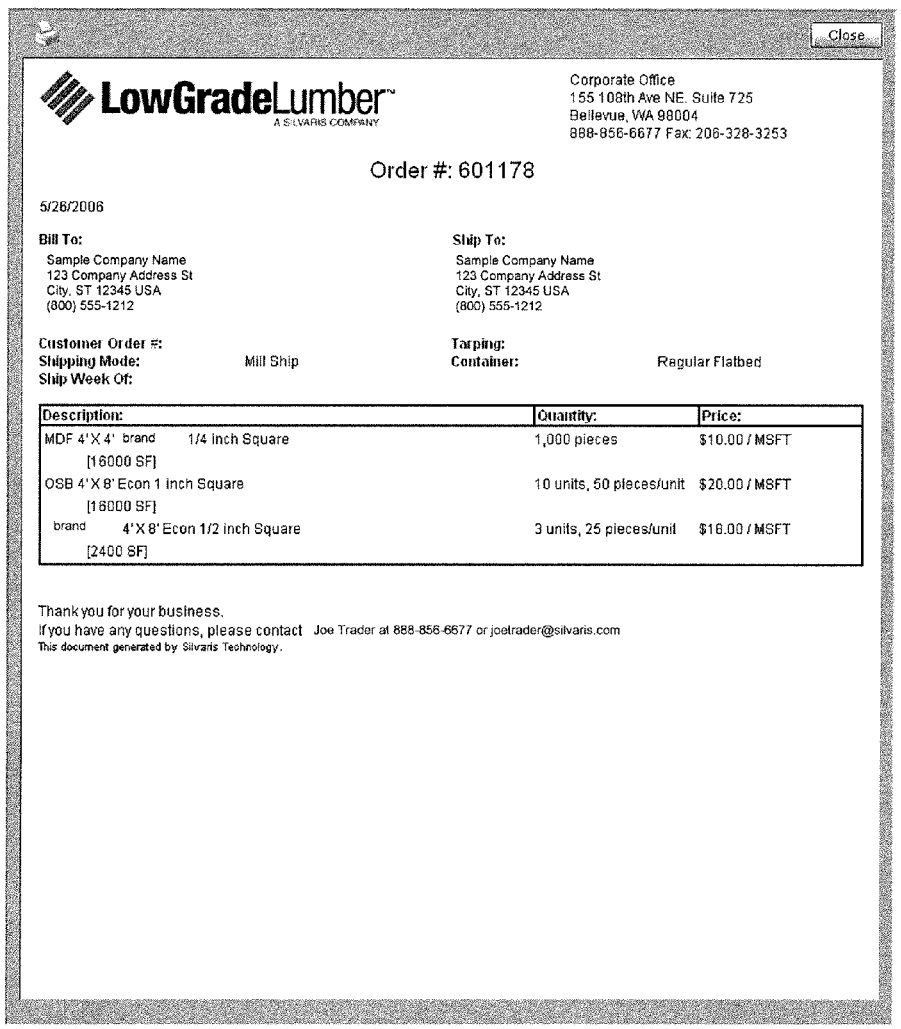
FIG. 9 depicts a screen shot of one embodiment of the invention showing a customer's order receipt.

FIG. 9 is a screen shot of one embodiment of the invention, a buyer's order receipt from CustomerConnect, as described in FIG. 1, block 500. This document includes the seller's sales order number, and summarizes the purchase information confirmed on the prior screen (FIG. 8).

An embodiment of the invention enables order quantities to be enforced programmatically—seller defines a "purchasable load" or customer builds their own load, according to load minimum and maximum quantities on an order.

An embodiment of the invention enables flexibility to define pricing to one customer or many customers; define your customer set however you like—region, credit rating, payment history, profitability, etc, or all of the above.

An embodiment of the invention enables cost modes—representing the wood in multiple conversion quantities.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A non-transitory computer-readable storage medium having computer-executable instructions that, when executed by a computing device perform at least the steps of:

receiving from a seller an indication of a first buyer that may purchase a first wood load under a first term set governing the sale of the first wood load;

receiving from the seller an indication of a second buyer that may purchase the first wood load under a second term set governing the sale of the first wood load, the second term set being different from the first term set;

receiving from the seller a description of the first wood load to display;

receiving from the seller at least one term governing the sale of the first wood load;

receiving from the seller a definition of wood product items that will appear on the first wood load;

receiving from a buyer a purchase order for the first wood load;

presenting a purchase confirmation to the buyer;

requesting a purchase order number;

generating a receipt for presentation to the buyer; and receiving from the seller a choice of whether to display the first wood load to or hide the load from buyer view.

2. A method implementable in an electronic system coupled to an electronic device, the electronic device being coupled to a display device, the method comprising:

receiving, with the electronic system, from a seller an indication of a first buyer that may purchase a first wood load under a first term set governing the sale of the first wood load;

receiving, with the electronic system, from the seller an indication of a second buyer that may purchase the first wood load under a second term set governing the sale of the first wood load, the second term set being different from the first term set;

receiving, with the electronic system, from the seller a description of the first wood load to display;

receiving, with the electronic system, from the seller at least one term governing the sale of the first wood load;

receiving, with the electronic system, from the seller a definition of wood product items that will appear on the first wood load;

serving, with the electronic system, to the electronic device a web page displayable on the display device, the displayed web page including a description of the first wood load;

receiving, with the electronic system, from the electronic device a purchase order for the first wood load;

presenting, with the electronic system, a purchase confirmation to the buyer;

requesting, with the electronic system, a purchase order number;

generating, with the electronic system, a receipt for presentation to the buyer; and receiving, with the electronic system, from the seller a choice of whether to display the first wood load to or hide the load from buyer view.

* * * * *